(12) United States Patent
Masse

(10) Patent No.: US 10,642,805 B1
(45) Date of Patent: May 5, 2020

(54) SYSTEM FOR DETERMINING QUERIES TO LOCATE DATA OBJECTS

(71) Applicant: AMAZON TECHNOLOGIES, INC., Seattle, WA (US)

(72) Inventor: James Edward Masse, Woodinville, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 264 days.

(21) Appl. No.: 15/376,084

(22) Filed: Dec. 12, 2016

(51) Int. Cl.
| | |
|---|---|
| H04L 12/24 | (2006.01) |
| G06F 16/215 | (2019.01) |
| G06F 16/28 | (2019.01) |
| G06F 16/2455 | (2019.01) |

(52) U.S. Cl.
CPC ........ G06F 16/215 (2019.01); G06F 16/2455 (2019.01); G06F 16/282 (2019.01)

(58) Field of Classification Search
CPC ......... G06F 17/30589; G06F 17/30327; G06F 17/30448; G06F 17/30525; G06F 17/30616; G06F 17/30625; G06F 17/3064; G06F 17/30646; G06F 17/30699
See application file for complete search history.

(56) References Cited

U.S. PATENT DOCUMENTS

| 6,356,887 | B1 * | 3/2002 | Berenson | .......... G06F 17/30433 |
| 8,713,049 | B2 * | 4/2014 | Jain | .................. G06F 17/30427 |
| | | | | 707/758 |
| 2004/0073539 | A1 * | 4/2004 | Dettinger | .......... G06F 17/30398 |
| 2004/0158163 | A1 * | 8/2004 | Cohen | ................. A61B 5/02007 |
| | | | | 600/508 |
| 2005/0234878 | A1 * | 10/2005 | Dettinger | .......... G06F 17/30395 |
| 2007/0276825 | A1 * | 11/2007 | Dettinger | .......... G06F 17/30392 |
| 2008/0052266 | A1 * | 2/2008 | Goldstein | .......... G06F 17/30474 |
| 2008/0172356 | A1 * | 7/2008 | Bruno | ................ G06F 17/30442 |
| 2013/0346594 | A1 * | 12/2013 | Banerjee | ............. G06F 11/3409 |
| | | | | 709/224 |
| 2014/0136251 | A1 * | 5/2014 | Bird | ..................... G06Q 10/063 |
| | | | | 705/7.11 |
| 2015/0142399 | A1 * | 5/2015 | Postma | ............... G06F 17/5009 |
| | | | | 703/2 |

* cited by examiner

*Primary Examiner* — Mark D Featherstone
*Assistant Examiner* — Kweku William Halm
(74) *Attorney, Agent, or Firm* — Lindauer Law, PLLC

(57) ABSTRACT

Described are techniques for automatically generating queries based on user input selecting one or more data objects. The parameters of the data objects may be used to generate an initial query. One or more parameters may be removed from the initial query to form an intermediate query. The parameters that are removed may be determined based on pruning data, which may indicate the frequency of the parameters within a data store and the likelihood that the parameters may be changed. The resulting intermediate query may be tested, then stored if the intermediate query locates the selected data objects. This process may be repeated until no additional parameters may be removed without causing the query to fail to locate the selected data objects. An output indicating the final query and at least a portion of the intermediate queries may be provided responsive to the user input.

20 Claims, 5 Drawing Sheets

SYSTEM FOR DETERMINING QUERIES TO LOCATE DATA OBJECTS

BACKGROUND

Users that interact with particular data within a larger body of data may generate queries that may be used to locate selected data objects at a later time.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

Figure 1:
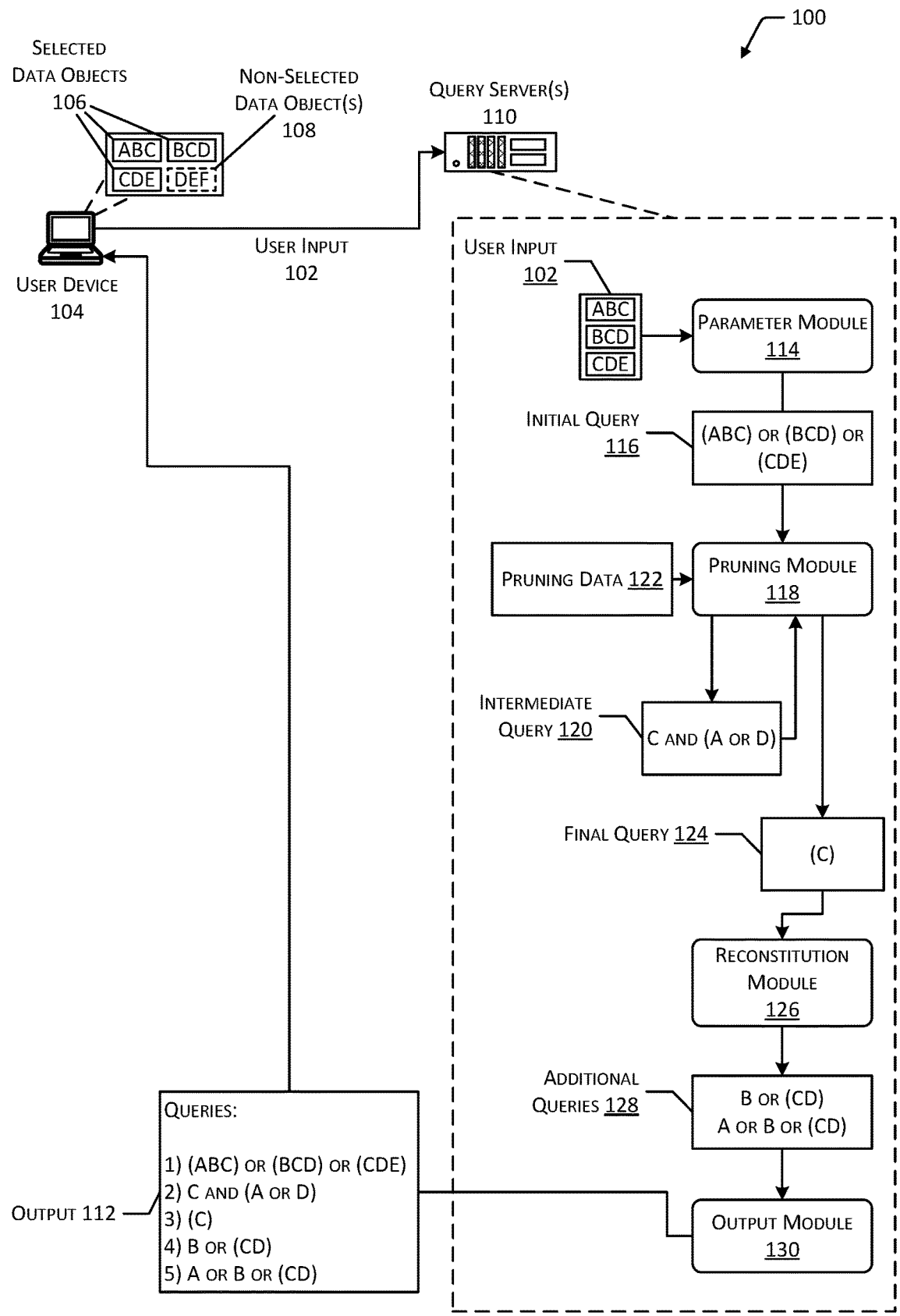
FIG. 1 illustrates an implementation of a system that may automatically generate a query responsive to user input selecting one or more data objects.

While implementations are described in this disclosure by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used in this disclosure are for organizational purposes only and are not meant to be used to limit the scope of the description or the claims. As used throughout this application, the word "may" is used in a permissive sense (i.e., meaning having the potential to) rather than the mandatory sense (i.e., meaning must). Similarly, the words "include", "including", and "includes" mean "including, but not limited to".

DETAILED DESCRIPTION

Users accessing a body of data stored in one or more data stores may use computer-executed queries to locate specific data objects within the data store(s). For example, a user that is programming or evaluating particular elements within a webpage may use a query to locate code associated with the particular elements. As another example, a user viewing one or more data objects within a database or other data structure, such as a tree, array, list, class, and so forth, may use a query to locate particular data, such as a node within a tree structure or a field within a class. Each data object may include a series of associated parameters, such as the presence or absence of specific fields, content, or metadata, the relationship between the data object and other data objects (e.g., parent, child, sibling, number of steps between data objects), the location of the data object within a data structure, particular identifiers of the data object, and so forth. A query may operate to locate one or more data objects by filtering data objects within a data store based on the presence or absence of one or more parameters. For example, the execution of a query specifying all child nodes in a tree structure related to a particular parent node may determine all nodes having a parameter indicating a child relationship to the particular parent node and cause an output indicative of those nodes to be generated. As another example, the execution of a query specifying particular code or alphanumeric data within a particular webpage may locate all instances of the particular code or alphanumeric data within the particular webpage while omitting other instances of the particular code or alphanumeric data that occur in other locations within the data store.

Typically, a user interacting with a set of data objects will manually generate a query to facilitate location of the same set of data objects at a future time. To do so, a user may determine one or more parameters or combinations of parameters that are unique to the data objects within the set, but in some cases may be common to multiple data objects within the set. In some cases, a set of parameters that may be used to locate a set of data objects may not be readily apparent. For example, a user may manually generate a query, test the query by executing it, and determine that the query does not locate the same set of data objects. In such cases, the user may modify the query and repeat this process many times before determining a query that will locate the desired set of data objects. This process may therefore represent a time consuming and inefficient use of computing resources.

Additionally, a query that is manually generated by a user may be more complex and contain more parameters than the minimum parameters necessary to locate the set of data objects. A larger, more complex query may consume a greater quantity of data storage and require a greater quantity of computational resources to execute when compared to a query that includes the minimum parameters necessary to locate the data objects. Furthermore, a query that is manually generated by a user may no longer locate the desired set of data objects if one or more of the data objects is moved or changed in a manner that deviates from the parameters of the query. In such a case, the user must typically locate the data objects manually and generate a new query.

For example, a user testing a user interface may generate a test using a querying language, such as XPath, to locate elements within the user interface that are to be verified or acted upon. Typically, to obtain such locators, the user will examine the user interface manually, then generate a XPath query, test the query to determine the results, and iterate the query until execution of the query locates only the relevant elements of the user interface. This process may require many iterations, and the created XPath queries may require frequent updates to remain compatible as the user interface is modified and updated. As another example, a user managing records in a database may generate a query using a querying language, such as SQL, to locate selected records in the database at a later time. Typically, to generate such a query, the user will manually examine the selected records, input a query, test the query, and repeat these steps until a query that returns only the desired records is determined. The resulting query may be more verbose or complex than what is necessary to locate the records, and in many cases, if portions of the database are modified, the query may no longer locate one or more of the desired records.

Described in this disclosure are techniques for automatically generating a query that may be used to locate data objects selected by a user, without requiring manual input from the user. In some implementations, the generated query may include the minimum parameters necessary to locate the selected data objects. Responsive to user input selecting one or more data objects, the parameters of the selected data objects may be determined. An initial query may then be generated that includes every discoverable parameter of the selected data objects. In some implementations, particular parameters that are known to be non-unique to the data objects, not useful for locating data objects, or likely to be changed in a manner that may prevent the query from locating a data object at a later time may be omitted from the initial query. For example, an index value or indications of relationship between a selected data object and one or more other data objects may not be useful for differentiating a particular data object from other data objects. Therefore, in some cases, the initial query may omit indications of relationships, index values, and so forth.

The initial query may then be modified by removing one or more parameters, then executing the resulting query to determine whether the resulting query may be used to locate the data object(s) selected by the user. For example, the system may determine correspondence between the parameters of the initial query and pruning data. Pruning data may be used to determine particular parameters that, if removed from a query, are likely to result in a subsequent query that successfully locates the selected data objects. In some implementations, the pruning data may associate various parameters with particular weights. Continuing the example, if the weight value for a particular parameter is less than a threshold weight value, that parameter may be removed from the initial query. In other implementations, if the weight value is greater than a threshold value, or if the weight value deviates from a threshold range of values, the parameter may be removed from the initial query.

In some implementations, the weight values may include one or more of an importance metric or a changeability metric. An importance metric may indicate a rate of occurrence of particular parameters within a data store. For example, a parameter that is common to a large number of data objects may be less useful for locating a particular data object, and may thus have a value indicative of a low importance metric. Continuing the example, a parameter that is unique to a particular data object or uncommon within the data store may be more useful for locating the data object and may have a value indicating a large importance metric. A changeability metric may indicate a rate of change associated with particular parameters in the data store. For example, a parameter associated with the specific location of a data object within a tree structure or the relationship of the data object to another data object may be readily changeable if one or more data objects in the data store are moved or modified. Therefore, a query that includes this parameter may fail to locate a desired data object if modifications are made to the data store and as such, the parameter may have a value indicating a large changeability metric. Conversely, parameters that are generally static and unlikely to be modified, even if data objects are moved or restructured within the data store, may have a value indicative of a low changeability metric.

Modification of the initial query may include removal of one parameter or a group of parameters. For example, a single parameter having the lowest importance metric or greatest changeability metric may be removed. As another example, all parameters having a combined importance and changeability metric less than a threshold value may be removed. The removal of one or more parameters from the initial query may form an intermediate query. The intermediate query may then be tested by applying the intermediate query to the data objects in the data store. If the intermediate query locates each of the data objects selected by the user and does not locate any additional data objects, the intermediate query may be saved, and the process may continue. If the intermediate query fails to locate each of the selected data objects, or if the intermediate query locates other data objects not selected by the user, the removed parameters may be restored to the initial query, and the process may be repeated by removing a different parameter or set of parameters, based on the pruning data. In some implementations, the intermediate query may be saved, and the process may continue, if the results of the application of the intermediate query to the data store are within a threshold tolerance of the data objects selected by the user. For example, if the data objects located by the intermediate query lack a number or percentage of selected data objects or include a number or percentage of non-selected data objects less than a threshold number or percentage, the intermediate query may be saved.

In some implementations, intermediate queries that successfully locate the selected data objects may be retained as pruning data. Subsequent parameters that are removed and subsequent intermediate queries that are retained may be determined by comparing the resulting queries to the intermediate queries retained as pruning data. For example, removal of parameters from a query to generate a resulting query that is extremely similar to a retained intermediate query may result in redundant output that is not useful to a user. As another example, removal of parameters from a query to generate a resulting query that is extremely different from any retained intermediate queries may result in a query that is unlikely to locate the selected data objects successfully. A comparison between a resulting query and any number of stored intermediate queries may be used in place of or in addition to importance or changeability metrics associated with the parameters.

An additional parameter or set of parameters may then be removed from the intermediate query, based on the pruning data, and the resulting query may be tested by applying the resulting query to the data objects in the data store. Each resulting query that may be successfully used to locate the selected data objects may be saved, while each resulting query that fails to do so may be discarded and the process may be repeated with the previous query by removing a different set of parameters. When no additional parameters may be removed from a final query without causing the query to fail to locate the selected data objects, the final query and one or more of the intermediate queries determined during the process may be output via a user interface. The output may also include the initial query. In other implementations, a resulting query may be determined to be a final query if the resulting query is less than a threshold size, contains less than a threshold number of parameters, and so forth. In some implementations, one or more rules or user preferences may be used to determine a particular subset of intermediate queries that are included in the output. For example, the output may be configured to include a maximum number of queries, and various characteristics of the intermediate queries may determine whether a particular query is included in the output. Continuing the example, queries having a smaller number of parameters may be prioritized over queries having a larger number of parameters. In other cases, queries having a selected number of parameters may be prioritized over queries having a number of parameters greater or less than the selected number. As another example, queries having particular parameters may be prioritized over queries having one or more other parameters. As yet another example, queries having parameters different than other queries included in the output may be prioritized over queries that are extremely similar to the other output queries. In some implementations, subsequent to presentation of the output, the user input may select one or more of the presented queries, which may be stored in association with the user account for use locating the selected data objects. In some cases, the user input may include a modification of one or more of the queries prior to storing the queries in association with the user account.

Automatic generation of a query may provide a user with a tool for locating selected data objects without consuming the time and computing resources normally required to manually generate and test numerous queries. Additionally, the resulting queries may be less complex and contain fewer parameters than a manually-generated query, requiring less data storage to retain and less computing resources to execute. For example, a computer-implemented process for removing parameters based on pruning data and testing the resulting queries may result in the removal and retention of various combinations of parameters that would not be recognized or appreciated by a human user. Furthermore, the resulting queries may be less likely to be rendered non-functional due to changes to one or more data objects when compared to manually-generated queries.

FIG. 1 illustrates an implementation of a system 100 that may automatically generate a query responsive to user input 102 selecting one or more data objects. For example, a user interacting with a user device 104 may access a user interface displaying a plurality of data objects. Continuing the example, the user interface may include output indicative of a portion of a database or other data structure, a webpage, or any other type of user interface displaying at least one data object. In other implementations, the user interface may include one or more of audio, haptic, or olfactory output. Data objects may include portions of code or other alphanumeric data, fields, graphical elements, records or other types of data that may be accessed by the user device 104. The user device 104 may be used to provide user input 102 indicative of one or more selected data objects 106. For example, a user accessing the user device 104 may wish to locate the selected data objects 106 at a later time without manually differentiating the selected data objects 106 from other non-selected data objects 108. Typically, a user may attempt to manually generate a query including parameters sufficient to locate the selected data objects 106 while excluding the non-selected data objects 108. However, as described previously, the manual generation of a query may consume significant time and computing resources and may result in a more complex query than what is necessary to locate the selected data objects 106, or a query that may readily be rendered non-functional by changes to one or more of the data objects.

One or more query servers 110 may receive the user input 102 and generate one or more queries that may be used to locate the selected data objects 106 while excluding the non-selected data objects 108. At least a subset of the queries determined by the query server(s) 110 may be provided to the user device 104 as output 112. While FIG. 1 depicts a single query server 110, in other implementations, the query server(s) 110 may include any number and any type of computing device including, without limitation, one or more personal computers, smartphones, tablet computers or other mobile devices, set-top boxes, wearable computers, automotive computers, servers, and so forth.

A parameter module 114 associated with the query server(s) 110 may determine the parameters associated with the selected data objects 106. Parameters may include characteristics of the selected data objects 106 that may be used to locate the selected data objects 106 within a data store or data structure, such as by filtering or otherwise differentiating the selected data objects 106 from non-selected data objects 108. For example, a parameter may include the presence or absence of a particular field, the presence or absence of particular alphanumeric data, the presence or absence of particular types of data, indicia of the relationship between a particular data object and another object, indicia of the location of a data object within a data structure or relative to other data objects, identifiers associated with particular data objects, index values associated with particular data objects, and so forth. The parameter module 114 may generate an initial query 116 that includes at least a subset of the parameters determined from the selected data objects 106. In some implementations, the initial query 116 can include every parameter determined from the selected data objects 106. In other implementations, the parameter module 114 may be configured to exclude particular parameters or particular types of parameters from the initial query 116.

While the initial query 116 may function to locate the selected data objects 106 within a data store, the initial query 116 may contain a larger number of parameters than the minimum parameters necessary to locate the selected data objects 106. For example, storage of the initial query 116 may require greater storage space than a smaller query, and execution of the initial query 116 may require a greater amount of time and computing resources than execution of a smaller query. Additionally, if one or more data objects in the data store containing the selected data objects 106 are modified, the initial query 116 may no longer successfully locate the selected data objects 106. For example, if a particular data object is moved, one or more parameters of a selected data object 106 that indicate the relationship of that selected data object 106 to the moved data object may be changed. If the initial query 116 includes such a parameter, the initial query 116 may no longer locate the selected data object 106.

A pruning module 118 associated with the query server(s) 110 may modify the initial query 116 by removing one or more parameters to form an intermediate query 120. The particular parameters that are removed from the initial query 116 may be determined based on pruning data 122. The pruning data 122 may associate one or more weights with various parameters. For example, the pruning data 122 may include an importance metric associated with a particular parameter, the importance metric including an indication of the uniqueness of the particular parameter within a data store. Continuing the example, a particular parameter that is extremely common among multiple data objects, such as a commonly-used alphanumeric string or an indication of a child relationship to a parent object with many child objects, may be less useful for differentiating a particular selected data object 106 from non-selected data objects 108. Conversely, a particular parameter that is unique to a selected data object 106 or uncommon within a data store may be useful to differentiate the selected data object 106 from non-selected data objects 108. As another example, the pruning data 122 may include a changeability metric associated with a particular parameter. A changeability metric may indicate the likelihood of the particular parameter to be modified. Continuing the example, a parameter that may change frequently if one or more data objects are modified, such as an indication of the relationship between a particular selected data object 106 and other data objects, may change if certain data objects within a data store are modified. Parameters that are likely to be changed as data objects are modified may cease to locate a selected data object 106 subsequent to such modifications.

The pruning module 118 may remove a single parameter or multiple parameters from the initial query 116 based on the pruning data 122. For example, the pruning data 122 may include one or more rules or configurations indicating the manner in which parameters are to be removed. Continuing the example, the pruning data 122 may indicate that single parameters are to be sequentially removed based on one or more of importance metrics or changeability metrics. As another example, the pruning data 122 may indicate that all parameters having an importance metric or changeability metric less than a threshold value are to be removed to form the intermediate query 120.

The pruning module 118 may also test the intermediate query 120 to determine whether the intermediate query 120 may be executed to locate the selected data objects 106. For example, if application of the intermediate query 120 to the data store containing the selected data objects 106 does not locate each selected data object 106 while excluding non-selected data objects 108, the intermediate query 120 may be discarded, and the pruning module 118 may generate a different intermediate query 120 by removing one or more different parameters from the initial query 116. If application of the intermediate query 120 to the data store locates the selected data objects 106 while excluding the non-selected data objects 108, the intermediate query 120 may be retained. In some implementations, the intermediate query 120 may be retained if the intermediate query 120 does not locate a number or percentage of selected data objects 106 less than a threshold number or percentage, or if the intermediate query 120 locates a number or percentage of non-selected data objects 108 less than a threshold number or percentage.

In some implementations, a retained intermediate query 120 may be stored as additional pruning data 122, and the removal of parameters from subsequent queries may be determined by comparing the subsequent queries to the retained intermediate queries 120. For example, a subsequent query that is similar to a retained intermediate query 120 may be more likely to successfully locate the selected data objects 106 than a query that differs significantly from each retained intermediate query 120.

An intermediate query 120 may be further processed by the pruning module 118, which may remove one or more parameters therefrom based on the pruning data 122. The resulting query may include an additional intermediate query 120, which may be tested and processed in the manner described above, or the resulting query may include a final query 124. The pruning module 118 may test the final query 124 by applying the final query 124 to the data store containing the selected data objects 106. If the final query 124 locates each selected data object 106 and excludes non-selected data objects 108, the final query 124 may be retained. In some implementations, the final query 124 may be further processed by the pruning module 118, which may attempt to remove one or more parameters therefrom based on the pruning data 122. If it is determined that no additional parameters may be removed from the final query 124 without rendering the resulting query unable to locate the selected data objects 106, then the final query 124 and one or more of the intermediate queries 120 may be included in the output 112. The output 112 may also include the initial query 116. In other implementations, a resulting query may be determined to be the final query 124 based on the size of the final query 124 being less than a threshold size, a count of parameters removed to form the final query 124 being greater than a threshold count, and so forth.

In some implementations, a reconstitution module 126 may add one or more parameters to the final query 124 to form one or more additional queries 128. The reconstitution module 126 may apply the additional queries 128 to the data objects to determine one or more additional queries 128 that successfully locate each selected data object 106 and exclude non-selected data objects 108. For example, the pruning module 118 may remove particular parameters from the initial query 116 to generate one or more intermediate queries 120, and particular parameters from the intermediate queries 120 to generate the final query 124. However, the process of removing particular parameters based on pruning data 122, using the pruning module 118, may not determine each possible combination of removed parameters, and thus, each possible intermediate query 120 that may function to locate the selected data objects 106. The additional queries 128 determined by the reconstitution module 126 may include such intermediate queries 120 that were not determined by the pruning module 118.

An output module 130 associated with the query server(s) 110 may generate the output 112 based on the final query 124, one or more intermediate queries 120 determined by the pruning module 118, and one or more additional queries 128 determined by the reconstitution module 126. For example, the output 112 may include an indication of the final query 124, at least one intermediate query 120, one or more additional queries 128, and the initial query 116. In some implementations, a user associated with the user device 104 may select one or more of the queries indicated in the output 112 for retention. Selected queries may be stored in association with a user account. In other implementations, a user associated with the user device 104 may modify one or more of the queries indicated in the output 112.

Figure 2:
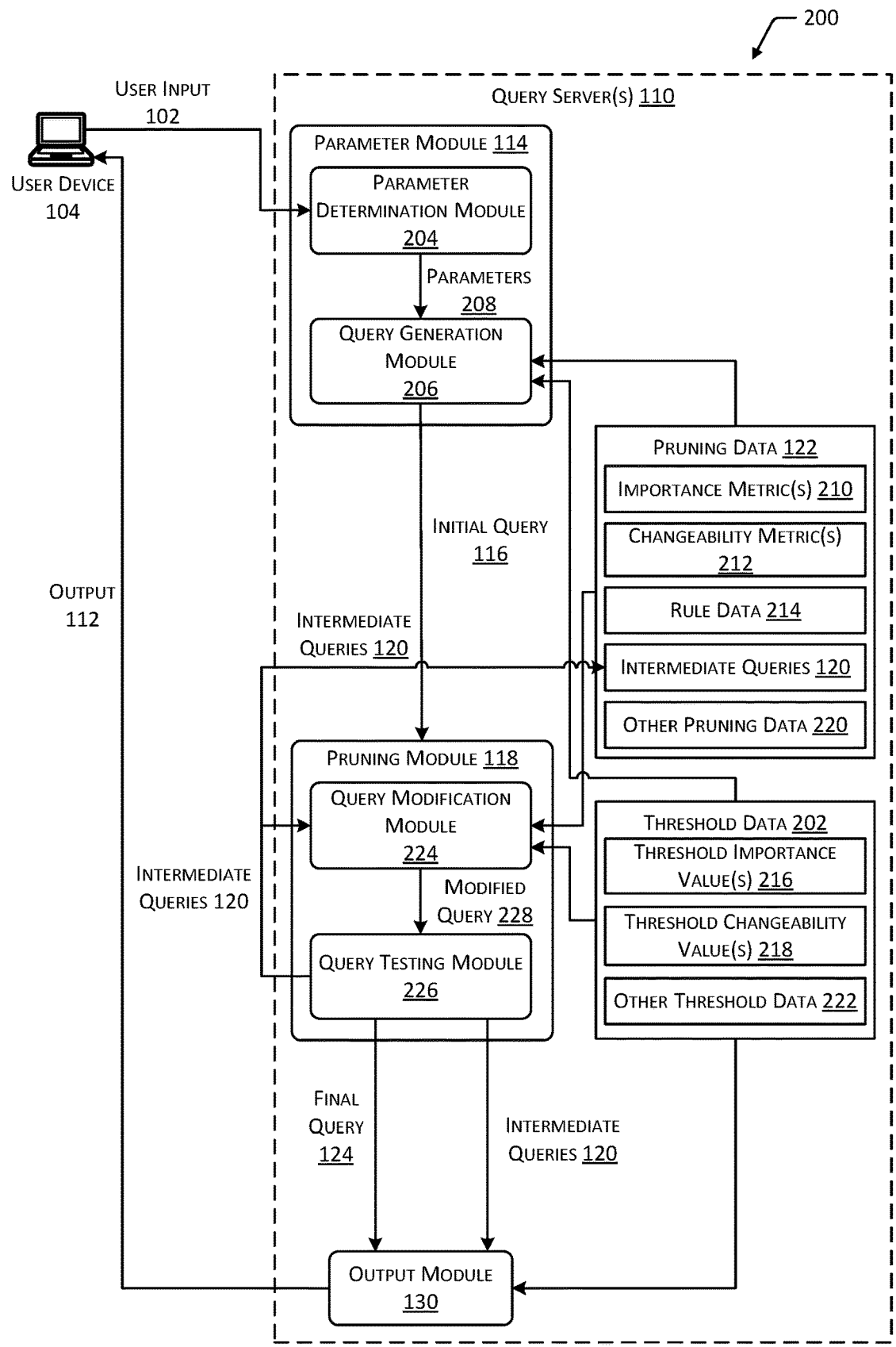
FIG. 2 illustrates an implementation of a system that may automatically generate queries based on pruning data and threshold data.

FIG. 2 illustrates an implementation of a system 200 that may automatically generate queries based on pruning data 122 and threshold data 202. As described with regard to FIG. 1, a user device 104 may provide user input 102 indicative of one or more selected data objects 106 to a parameter module 114 associated with one or more query servers 110. The parameter module 114 may include a parameter determination module 204 and a query generation module 206. The parameter determination module 204 may determine one or more parameters 208 associated with the selected data objects 106. For example, the parameter determination module 204 may determine the selected data objects 106 from the user input 102, then access the data store containing the selected data objects 106 or another data source indicative of the parameters 208 of the selected data objects 106. The parameter determination module 204 may determine the parameters 208 associated with the selected data objects 106 and provide data indicative of the parameters 208 to the query generation module 206.

The query generation module 206 may generate an initial query 116 based on the parameters 208 determined by the parameter determination module 204. In some implementations, the initial query 116 may include each parameter 208 determined by the parameter generation module 204. In other implementations, the initial query 116 may include a subset of the determined parameters 208. For example, the query generation module 206 may access pruning data 122, which may indicate one or more of importance metrics 210 or changeability metrics 212 associated with the determined parameters 208. The pruning data 122 may also include rule data 214, which may indicate one or more rules, algorithms, equations, and so forth that may be used to determine particular parameters 208 for inclusion in or exclusion from the initial query 116. Continuing the example, the rule data 214 may indicate one or more relationships between particular importance metrics 210 or changeability metrics 212 and threshold data 202. In some cases, the importance metrics 210 may include quantifiable scores, and the threshold data 202 may include one or more threshold importance values 216 indicative of minimum importance scores, maximum importance scores, or ranges of importance scores. The rule data 214 may indicate particular relationships between the importance metrics 210 of the parameters 208 and particular threshold importance values 216 responsive to which the parameters 208 may be included in or excluded from the initial query 116. The threshold data 202 may also include one or more threshold changeability values 218 indicative of minimum or maximum changeability scores, ranges of changeability scores, and so forth. The rule data 214 may indicate particular relationships between the changeability metrics 212 of the parameters 208 and one or more threshold changeability values 218 responsive to which the parameters 208 may be included in or excluded from the initial query 116.

Other pruning data 220 may include user settings, configurations, or preferences, default configurations, and so forth. For example, a user input 102 or default configuration may indicate particular types of parameters 208 that are to be included in or excluded from the initial query 116, independent of the associated importance metric 210 or changeability metric 212 thereof. As another example, machine learning techniques may be used to determine particular types of parameters 208 that are included in queries selected by users when presented in an output 112. Other threshold data 222 may also include user settings, configurations, or preferences, default configurations, and so forth. For example, one or more threshold values may include user input values. In other cases, threshold values may be determined using machine learning techniques. For example, as particular parameters 208 are affected by modifications to one or more data objects, the threshold changeability values 218 may be modified to exclude the particular parameters from subsequent queries.

As described with regard to FIG. 1, a pruning module 118 associated with the query server(s) 110 may receive the initial query 116 from the parameter module 114. The pruning module 118 may include a query modification module 224 and a query testing module 226. The query modification module 224 may remove one or more parameters 208 from the initial query 116 to perform a modified query 228. The query modification module 224 may access the pruning data 122 and the threshold data 202 to determine particular parameters 208 to be removed from the initial query 116. For example, the threshold data 202 may include multiple threshold importance values 216 or threshold changeability values 218. The rule data 214 may indicate a particular order in which parameters 208 are to be removed from the initial query 116, sequentially or in combination with one another, based on the relationship between the importance metrics 210 and changeability metrics 212 of those parameters 208 and the corresponding threshold values. In some implementations, if the query generation module 206 excluded one or more parameters 208 from the initial query 116 based on the rule data 214 and threshold data 202, the threshold values used by the query modification module 224 may differ from the threshold values used by the query generation module 206.

The query testing module 226 may receive the modified query 228 from the query modification module 224 and may test the modified query 228 by applying the modified query 228 to the data store containing the selected data objects 106. If the modified query 228 does not successfully locate the selected data objects 106 or locates one or more non-selected data objects 108, the modified query 228 may be discarded, and the query modification module 224 may generate a different modified query 228 by removing a different parameter 208 or set of parameters 208 from the previous query. The different parameter(s) 208 that are removed may be determined based on the pruning data 122 and the threshold data 202. For example, if removal of a parameter 208 having a value indicative of the greatest changeability metric 212 results in a modified query 228 that does not locate a selected data object 106, the query modification module 224 may generate a different modified query 228 by removing a parameter 208 having a second greatest changeability metric 212. In some implementations, the other threshold data 222 may include permitted deviations between the result of the modified query 228 and the selected data objects 106. For example, if a count or percentage of selected data objects 106 located by the modified query 228 is greater than a threshold count or percentage of selected data objects 106, the modified query 228 may be retained. As another example, if a count or percentage of non-selected data objects 108 located by the modified query 228 is less than a threshold count or percentage of non-selected data objects 108, the modified query 228 may be retained.

A retained modified query 228 may be provided to the output module 130 as an intermediate query 120. In some implementations, one or more of the query testing module 226 or the output module 130 may refrain from causing a particular intermediate query 120 to be presented as output 112 based on the threshold data 202. For example, if an intermediate query 120 has a size or count of parameters 208 greater than a threshold size or count of parameters 208, the query testing module 226 may refrain from providing the intermediate query 120 to the output module 130, or the output module 130 may refrain from including the intermediate query 120 in the output 112. As another example, if an intermediate query 120 would utilize a quantity of computing resources in excess of a threshold quantity of computing resources when executed, the query testing module 226 may refrain from providing the intermediate query 120 to the output module 130, or the output module 130 may refrain from including the intermediate query 120 in the output 112.

Intermediate queries 120 may also be stored as pruning data 122, such that the query modification module 224 may compare subsequent modified queries 228 to stored intermediate queries 120 to select particular parameters 208 for removal. Intermediate queries 120 may also be provided from the query testing module 226 to the query modification module 224, which may modify the intermediate query 120 by removing one or more additional parameters 208 therefrom, based on the pruning data 122 and the threshold data 202. The resulting modified query 228 may be tested by the query testing module 226 and either discarded or retained as additional pruning data 122 and an additional intermediate query 120 that may be included as output 112. This process may be repeated until the resulting query has a size or count of parameters 208 less than a threshold size or count of parameters 208, or until removal of an additional parameter 208 causes the query to fail to locate the selected data objects 106. The resulting query may then be provided to the output module 130 as a final query 124. As described with regard to FIG. 1, the output module 130 may generate an output 112 indicative of the final query 124, the initial query 116, and at least a portion of the intermediate queries 120 generated by the pruning module 118. As described previously, in some implementations, one or more intermediate queries 120 may be excluded from the output 112 based on the threshold data 202. Additionally, as described with regard to FIG. 1, in some implementations, a reconstitution module 126 may generate one or more additional queries 128 based on the final query 124 and the pruning data 122. The one or more of the additional queries 128 may be included in the output 112.

Figure 3:
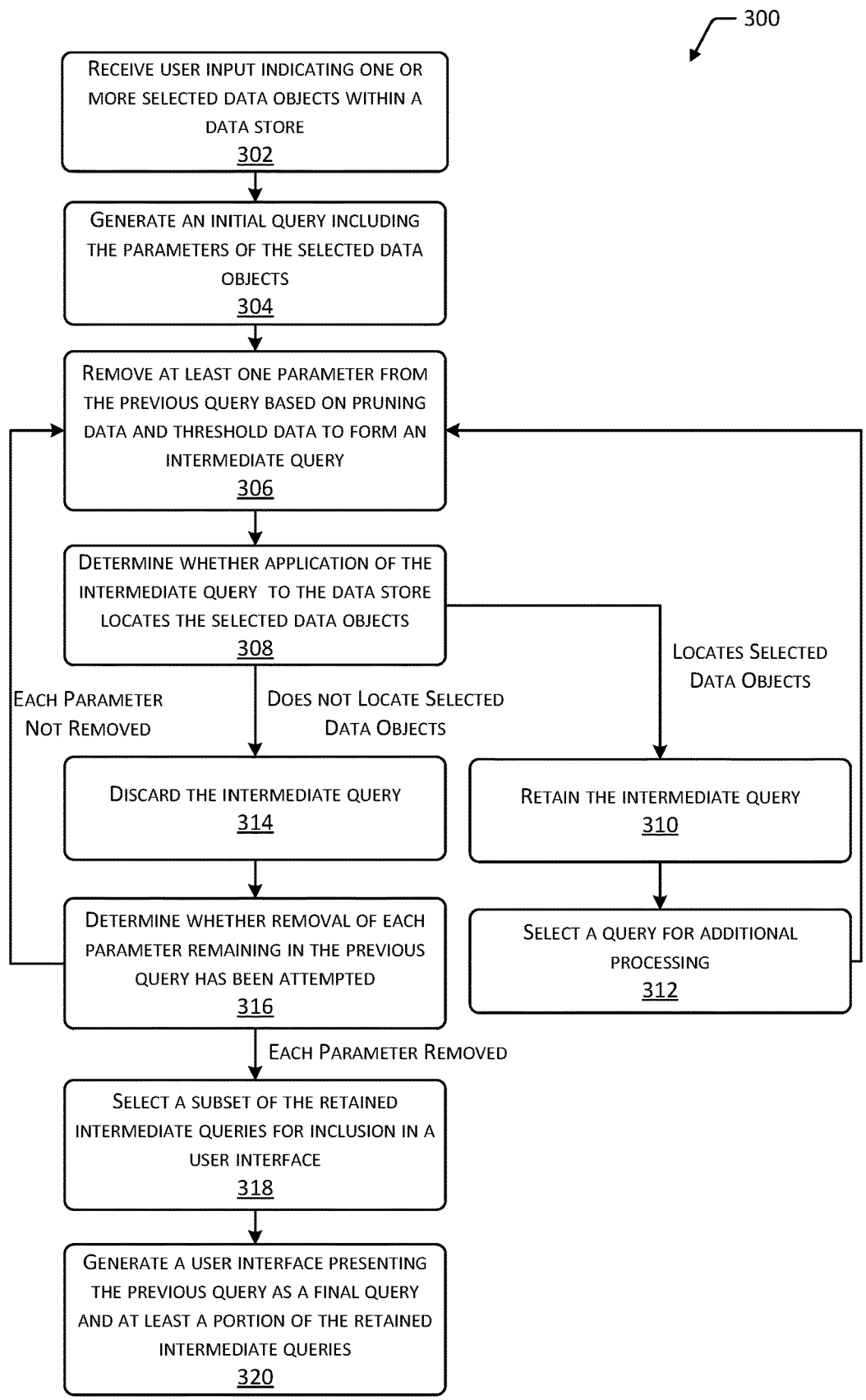
FIG. 3 is a flow diagram illustrating an implementation of a method for determining one or more queries based on user input selecting one or more data objects.

FIG. 3 is a flow diagram 300 illustrating an implementation of a method for determining one or more queries based on user input 102 selecting one or more data objects. Block 302 receives user input 102 indicating one or more selected data objects 106 within a data store. For example, a user accessing a user interface using one or more user devices 104 may indicate one or more data objects using one or more input devices. Data objects may include particular alphanumeric data, fields, graphical elements, records, or other content that is part of a database, tree structure, or other type of data structure.

Block 304 generates an initial query 116 including the parameters 208 of the selected data objects 106. For example, a parameter determination module 204 may access the data store or another data source indicative of the parameters 208 of the selected data objects 106 to determine the parameters 208. A query generation module 206 may generate an initial query 116 based on the parameters 208. In some implementations, the initial query 116 may include each parameter 208 determined by the parameter determination module 204. In other implementations, as described with regard to FIG. 2, the initial query 116 may omit one or more of the determined parameters 208 based on pruning data 122 and threshold data 202.

Block 306 removes at least one parameter 208 from the previous query based on the pruning data 122 and the threshold data 202 to form an intermediate query 120. For example, the pruning data 122 may indicate importance metrics 210 indicative of the rate of occurrence of particular parameters 208 within the data store. The pruning data 122 may also indicate changeability metrics 212 indicative of the rate of change of particular parameters 208 within the data store. Based on correspondence between the threshold data 202 and the importance metrics 210 and changeability metrics 212 for the parameters 208 of the previous query, a query modification module 224 may determine one or more parameters 208 to remove from the previous query. For example, the pruning data 122 may include rule data 214 specifying relationships between the importance metrics 210 and changeability metrics 212 of the query parameters 208 and the threshold importance values 216 and threshold changeability values 218 of the threshold data 202 responsive to which particular parameters 208 may be included or excluded from the intermediate query 120. The rule data 214 may also indicate whether individual parameters 208 or combinations of parameters 208 may be removed to form the intermediate query 120.

Block 308 determines whether application of the intermediate query 120 to the data store locates the selected data objects 106. If the intermediate query 120 locates the selected data objects 106 while excluding non-selected data objects 108, the process may proceed to block 310, which retains the intermediate query 120. Blocks 306 and 308 may then be repeated, to remove additional parameters 208 from the intermediate query 120 to form a subsequent intermediate query 120, then apply the subsequent intermediate query 120 to the data store. In some cases, the parameters 208 that are removed to form subsequent intermediate queries 120 may be determined by comparing the subsequent intermediate queries 120 to previous intermediate queries 120. In some implementations, threshold data 202 may include permitted deviations between the result of the intermediate query 120 and the selected data objects 106. For example, if a count or percentage of selected data objects 106 or non-selected data objects 108 located by the intermediate query 120 is less than a threshold count or percentage, the process may proceed to block 310 and the intermediate query 120 may be retained. Block 312 may then select a query for additional processing, and the process may continue with the selected query at block 306. In some cases, the intermediate query 120 that was retained at block 310 may be selected for additional processing. However, in other cases, based on one or more of rule data 214 or threshold data 202, the intermediate query 120 may be retained, but one of the previous queries that was determined may instead be selected for additional processing. For example, if further modification of the retained intermediate query 120 is unlikely to result in a query that will successfully locate selected data objects 106, a different query may be selected for further processing. As another example, if further modification of a retained intermediate query 120 may result in queries that are unlikely to be of use to a user due to the resulting queries being similar to other intermediate queries 120 that have already been determined, a different query may be selected.

If removal of one or more parameters 208 from the previous query forms an intermediate query 120 that fails to locate one or more selected data objects 106, or that locates one or more non-selected data objects 108, the process may proceed to block 314, which discards the intermediate query 120. In other implementations, the intermediate query 120 may be modified by restoring the parameters 208 that were removed at block 306, to form the previous query.

Block 316 may then determine whether removal of each parameter 208 remaining in the previous query has been attempted. For example, if at least one parameter 208 has not yet been removed from the previous query at block 306, it may be possible to reduce the size and count of parameters 208 to form a query that may still locate the selected data objects 106. In such cases, blocks 306 and 308 may be repeated, and one or more parameters 208 that have not been previously removed from the current query may be removed to form a subsequent intermediate query 120, which may be tested to determine whether the subsequent intermediate query 120 locates the selected data objects 106. In some implementations, one or more of the pruning data 122 or threshold data 202 may indicate particular parameters 208 that may be excluded from removal. For example, a user or default configuration may indicate that a particular type of parameter 208 may be included in resulting queries independent of the importance metrics 210 or changeability metrics 212 thereof. As another example, the rule data 214 may indicate that parameters 208 having an importance metric 210 greater than or changeability metric 212 less than a particular threshold value may be excluded from removal.

If removal of each parameter 208 from the current query has been attempted, the process may proceed to block 318. Block 318 selects a subset of the retained intermediate queries 120 for inclusion in a user interface. For example, one or more of rule data 214 or threshold data 202 may indicate that an output 112 provided to a user is to include a maximum number of queries. Rule data 214 may indicate particular characteristics of intermediate queries 120 that are to be prioritized for output. For example, the rule data 214 may indicate that queries having fewer parameters or queries that are closest to a selected size may be prioritized over other queries. As another example, the rule data 214 may indicate that queries having particular parameters are to be prioritized over queries that lack the particular parameters. As yet another example, the rule data 214 may indicate that queries that include parameters 208 that differ from those of other included queries are to be prioritized.

Block 320 generates a user interface presenting the previous query as a final query 124. The user interface may also include at least a portion of the retained intermediate queries 120. In some implementations, the user interface may also include the initial query 116.

Figure 4:
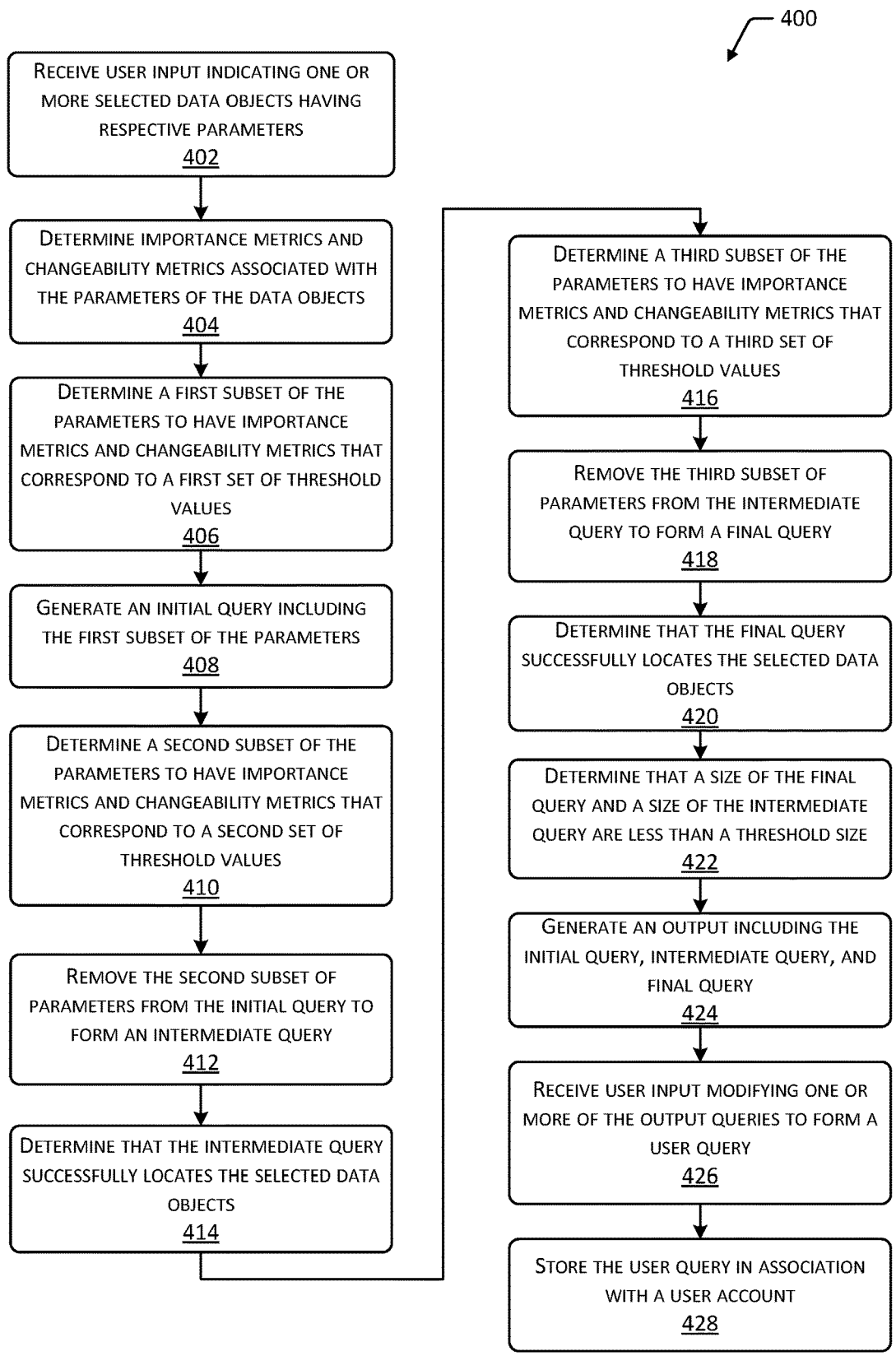
FIG. 4 is a flow diagram illustrating an implementation of a method for determining one or more queries based on pruning data and threshold data.

FIG. 4 is a flow diagram 400 illustrating an implementation of a method for determining one or more queries based on pruning data 122 and threshold data 202. Block 402 receives user input 102 indicating one or more selected data objects 106 having respective parameters 208. As described with regard to FIGS. 1-3, a user interacting with a user device 104 may select or indicate particular data objects using one or more input devices. Each data object may include respective parameters 208, such as particular code or alphanumeric data, the presence or absence of particular fields, the presence or absence of particular metadata, a type or category associated with the data object, indications of the relationship between the data object and other data objects, index values, and so forth.

Block 404 determines importance metrics 210 and changeability metrics 212 associated with the parameters 208 of the data objects. An importance metric 210 may include a value indicating the usefulness of a particular parameter 208 for locating an associated data object. For example, a value indicative of a large importance metric 210 may indicate that the parameter 208 is not common to many data objects within a data store and thus, may be a useful parameter 208 to include in a query configured to locate the particular data object. A low importance metric 210 may indicate that the parameter 208 is common to many data objects and may be of less use within a query configured to locate a particular data object. A changeability metric 212 may include a value indicating the likelihood of a particular parameter 208 to change responsive to modifications to one or more data objects within a data store. For example, a value indicative of a large changeability metric 212 may indicate that a particular parameter 208 depends on the values associated with numerous other parameters 208 or other data objects within a data store. Continuing the example, if an associated data object is modified, this modification to the data object may cause the value of the particular parameter 208 to change. A query that requires the particular parameter 208 to locate a selected data object 106 may cease to locate the data object if the value of the parameter 208 changes. Conversely, a low changeability metric 212 may indicate that the particular parameter 208 is less likely to change unless that parameter 208 is modified directly, such as by a user.

Block 406 determines a first subset of the parameters 208 to have importance metrics 210 and changeability metrics 212 that correspond to a first set of threshold values. For example, a parameter 208 may correspond to the first set of threshold values if the importance metric 210 for the parameter 208 exceeds a threshold importance value 216 and if the changeability metric 212 of for the parameter 208 is less than a threshold changeability value 218. In other implementations, a parameter 208 may correspond to the first set of threshold values if the importance metric 210 is less than a threshold value and the changeability metric 212 is greater than a threshold value. In still other implementations, a parameter 208 may correspond to the first set of threshold values if the importance metric 210 and changeability metric 212 are within threshold ranges. In other implementations, a parameter 208 may correspond to the first set of threshold values if the importance metric 210 and changeability metric 212 are equal to or deviate from particular threshold values.

Block 408 generates an initial query 116 including the first subset of parameters 208. For example, the initial query 116 may include each parameter 208 having an importance metric 210 that exceeds a threshold importance value 216 and a changeability metric 212 that is less than a threshold changeability value 218. In other implementations, block 406 may instead determine parameters 208 to be excluded from the initial query 116, and block 408 may generate an initial query 116 including each parameter 208 of the selected data objects 106 except for those determined at block 406.

Block 410 determines a second subset of the parameters 208 to have importance metrics 210 and changeability metrics 212 that correspond to a second set of threshold values. For example, a query modification module 224 may determine particular parameters 208 having importance metrics 210 that are less than a threshold importance value 216 or changeability metrics 212 that are greater than a threshold changeability value 218. Block 412 removes the second subset of parameters from the initial query 116 to form an intermediate query 120.

Block 414 determines that the intermediate query 120 successfully locates the selected data objects 106. For example, a query testing module 226 may execute the intermediate query 120 to determine the data object(s) located by the intermediate query 120. If the intermediate query 120 locates each selected data object 106 and does not locate a non-selected data object 108, the intermediate query 120 may be retained. If the intermediate query 120 fails to locate a selected data object 106 or locates one or more non-selected data objects 108, the intermediate query 120 may be discarded. In other implementations, if the intermediate query 120 locates the selected data objects 106 and excludes the non-selected data objects 108 within a threshold tolerance, the intermediate query 120 may be retained. For example, if a count or percentage of selected data objects 106 or non-selected data objects 108 located by the intermediate query 120 is less than a threshold count or percentage, the process may proceed to block 310 and the intermediate query 120 may be retained.

Block 416 determines a third subset of the parameters 208 to have importance metrics 210 and changeability metrics 212 that correspond to a third set of threshold values. For example, the query modification module 224 may determine particular parameters 208 of the intermediate query 120 having importance metrics 210 that are less than a threshold importance value 216 or changeability metrics 212 that are greater than a threshold changeability value 218. The third set of threshold values may differ from the second set of threshold values in block 410. For example, the threshold importance value 216 of the third set of threshold values may be smaller than that of the second set of threshold values, and the threshold changeability value 218 of the third set of threshold values may be greater than that of the second set of threshold values.

Block 418 removes the third subset of parameters 208 from the intermediate query 120 to form a final query 124. Block 420 determines that the final query 124 successfully locates the selected data objects 106. For example, the query testing module 226 may apply the final query 124 to the data store that contains the selected data objects 106 to determine whether the final query 124 locates each selected data object 106 while excluding non-selected data objects 108, within a threshold tolerance.

Block 422 determines that a size of the final query 124 and a size of the intermediate query 120 are less than a threshold size. The threshold size may include a particular quantity of data storage used to store a query, such as a count of bits. In other implementations, the threshold size may include a particular count of parameters 208 within the query. In still other implementations, the threshold size may include a quantity of computing resources used to execute the query. For example, if an intermediate query 120 has a size greater than a threshold size, then storage and execution of the intermediate query 120 may consume significant data storage or computing resources. In such cases, the intermediate query 120 may be suppressed from the output 112. Conversely, if the intermediate query 120 has a size less than the threshold size, the intermediate query 120 may be included in the output 112.

Block 424 generates an output 112 including the initial query, intermediate query 120, and final query 124. The output 112 may include any manner of user interface including one or more of visual, audible, tactile, or olfactory elements. The output 112 may include the initial query 116, intermediate query 120, and final query 124, or a link or other instructions that may be used to access the queries.

Block 426 receives user input 102 modifying one or more of the output queries to form a user query. For example, a user, upon reviewing the final query 124, may wish to add one or more parameters 208 thereto to facilitate locating specific data objects. The modified final query 124 may be stored as a user query. Block 428 stores the user query in association with a user account. At a subsequent time, a user may execute a stored query to locate the selected data objects 106 within a data store.

Figure 5:
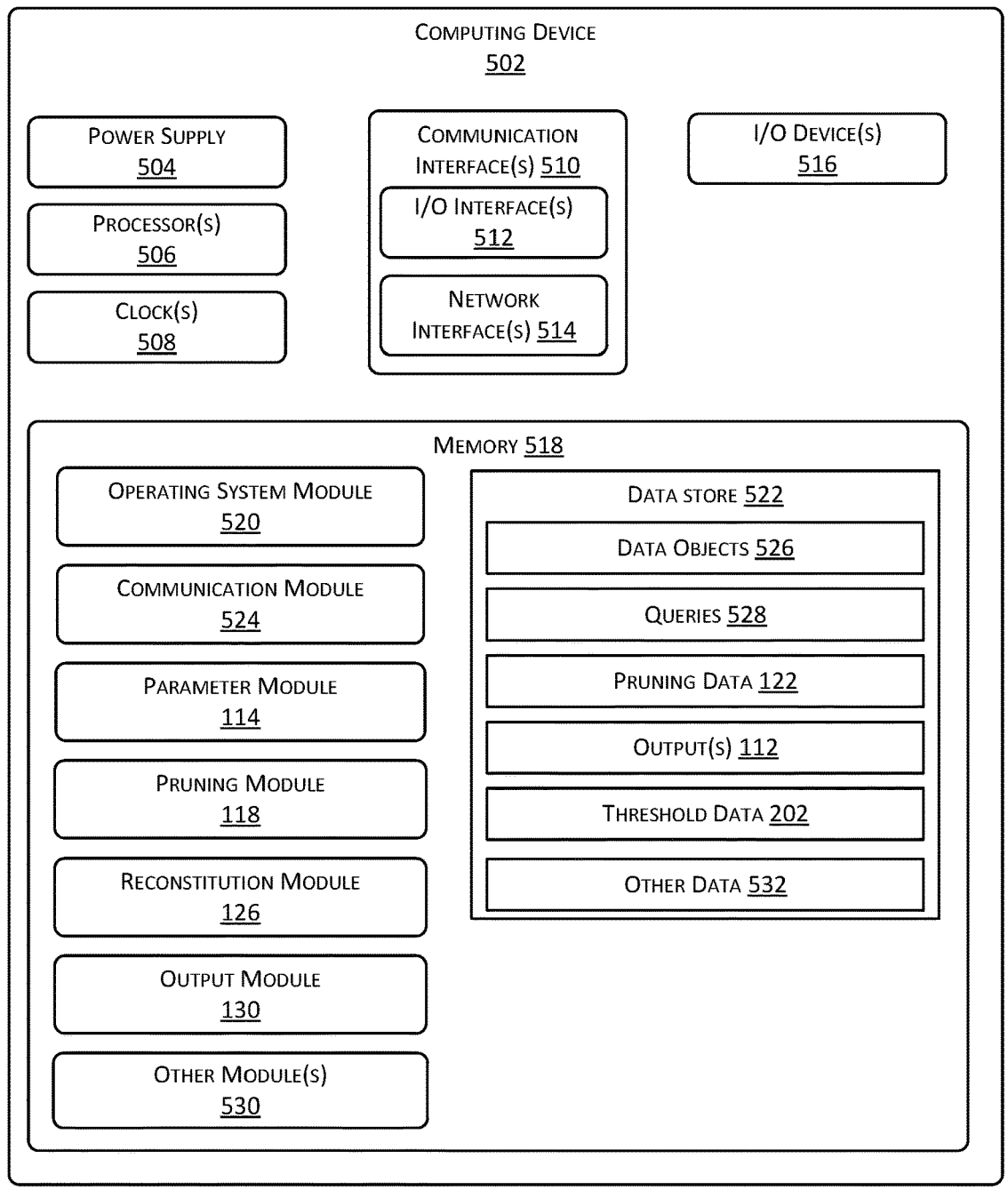
FIG. 5 is a block diagram illustrating an implementation of a computing device within the scope of present disclosure.

FIG. 5 is a block diagram 500 depicting an implementation of a computing device 502 within the scope of the present disclosure. While FIG. 5 depicts a single computing device 502, the block diagram 500 may represent any number and any type of computing devices 502 including, without limitation, one or more personal computers, smartphones, tablet computers or other mobile devices, set-top boxes, wearable computers, automotive computers, servers, and so forth. For example, the computing device 502 may include one or more query servers 110 configured to generate, execute, and modify queries, as well as store queries and associated sources of data used to generate and modify the queries.

One or more power supplies 504 may be configured to provide electrical power suitable for operating the components of the computing device 502. In some implementations, the power supply 504 may include a rechargeable battery, fuel cell, photovoltaic cell, power conditioning circuitry, and so forth.

The computing device 502 may include one or more hardware processor(s) 506 (processors) configured to execute one or more stored instructions. The processor(s) 506 may include one or more cores. One or more clocks 508 may provide information indicative of date, time, ticks, and so forth. For example, the processor(s) 506 may use data from the clock 508 to generate a timestamp, trigger a preprogrammed action, and so forth.

The computing device 502 may include one or more communication interface(s) 510, such as input/output (I/O) interface(s) 512, network interface(s) 514, and so forth. The communication interfaces 510 may enable the computing device 502, or components of the computing device 502, to communicate with other computing devices 502 or components thereof. The I/O interface(s) 512 may include interfaces such as Inter-Integrated Circuit (I2C), Serial Peripheral Interface bus (SPI), Universal Serial Bus (USB) as promulgated by the USB Implementers Forum, RS-232, and so forth.

The I/O interface(s) 512 may couple to one or more I/O device(s) 516. The I/O devices 516 may include any manner of input device or output device associated with the computing device 502 or with another computing device 502 in communication therewith. For example, I/O devices 516 may include touch sensors, keyboards, mouse devices, microphones, image sensors (e.g., cameras), scanners, displays, speakers, haptic devices, printers, motion sensors, location sensors, and so forth. In some implementations, the I/O device(s) 516 may be physically incorporated with a computing device 502 or may be externally placed.

The network interface(s) 514 may be configured to provide communications between the computing device 502 and other devices, such as the I/O devices 516, access points, routers, and so forth. The network interface(s) 514 may include devices configured to couple to one or more networks, including local area networks (LANs), wireless LANs (WLANs), wide area networks (WANs), wireless WANs (WWANs), and so forth. For example, the network interfaces 514 may include computing devices 502 compatible with Ethernet, Wi-Fi, Wi-Fi Direct, Bluetooth, Bluetooth Low Energy, ZigBee, Z-Wave, 3G, 4G, LTE, and so forth.

The computing device 502 may include one or more busses or other internal communications hardware or software that allows for the transfer of data between the various modules and components of the computing device 502.

As shown in FIG. 5, the computing device 502 may include one or more memories 518. The memory 518 may include one or more computer-readable storage media (CRSM). The CRSM may be any one or more of an electronic storage medium, a magnetic storage medium, an optical storage medium, a quantum storage medium, a mechanical computer storage medium, and so forth. The memory 518 may provide storage of computer-readable instructions, data structures, program modules, and other data for the operation of the computing device 502. A few example modules are shown stored in the memory 518, although the same functionality may alternatively be implemented in hardware, firmware, or as a system on a chip (SoC).

The memory 518 may include one or more operating system (OS) modules 520. The OS module 520 may be configured to manage hardware resource devices such as the I/O interfaces 512, the network interfaces 514, the I/O devices 516, and to provide various services to applications or modules executing on the processors 506. The OS module 520 may implement a variant of the FreeBSD operating system as promulgated by the FreeBSD Project; UNIX or a UNIX-like operating system; a variation of the Linux operating system as promulgated by Linus Torvalds; the Windows operating system from Microsoft Corporation of Redmond, Wash., USA; or other operating systems.

A data store 522 and one or more of the following modules may also be stored in the memory 518. The modules may be executed as foreground applications, background tasks, daemons, and so forth. The data store 522 may use a flat file, database, linked list, tree, executable code, script, or other data structure to store information. In some implementations, the data store 522 or a portion of the data store 522 may be distributed across one or more other devices including other computing devices 502, network attached storage devices, and so forth.

A communication module 524 stored in the memory 518 may be configured to establish communications with user devices 104, data sources remote from the computing device 502, or other computing devices 502.

The memory 518 may also store the parameter module 114. The parameter module 114 may be configured to receive user input 102 indicative of one or more data objects 526 stored in the data store 522. The data objects 526 associated with the user input 102 (e.g., selected data objects 106) may be differentiated from other data objects 526 in the data store 522 (e.g., non-selected data objects 108). The parameter module 114 may determine the parameters 208 associated with the selected data objects 106 and generate an initial query 116 that includes at least a subset of the parameters 208. In some implementations, the initial query 116 may include each parameter 208 determined by the parameter module 114. In other implementations, one or more parameters 208 may be excluded from the initial query 116 based on one or more of the pruning data 122 or the threshold data 202.

The memory 518 may additionally store the pruning module 118. The pruning module 118 may modify one or more queries 528 (e.g., initial queries 116, intermediate queries 120, or final queries 124) by removing one or more parameters 208 therefrom to form a modified query 228. The particular parameters 208 that are removed to form the modified query 228 may be determined based on the pruning data 122 and the threshold data 202. The pruning module 118 may test the modified query 228 to determine whether the modified query 228 locates the selected data objects 106 indicated by user input 102 by applying the modified query 228 to the data objects 526 in the data store 522. If the modified query 228 locates the selected data objects 106 while excluding non-selected data objects 108, within a tolerance indicated by the threshold data 202, the modified query 228 may be stored. For example, removal of one or more parameters 208 from an initial query 116 may form an intermediate query 120, while removal of one or more parameters 208 from an intermediate query 120 may form a subsequent intermediate query 120 or a final query 124. In some implementations, the pruning module 118 may remove one or more parameters 208 from the final query 124 to form a modified query 228. However, application of the modified query 228 to the data objects 526 may fail to locate the selected data objects 106. If the pruning module 118 determines that no additional parameter 208 may be removed from a query 528 without preventing the query 528 from locating the selected data objects 106, that query 528 may be stored as a final query 124. In other implementations, a query 528 may be stored as a final query 124 if the final query 124 has a size less than a threshold sizes indicated by the threshold data 202.

The memory 518 may also store the output module 130. The output module 130 may generate a user interface or other form of output 112 indicative of the final query 124 and one or more of the intermediate queries 120. In some implementations, the output 112 may include each intermediate query 120 determined by the pruning module 118. In other implementations, one or more intermediate queries 120 may be excluded from the output 112. For example, if the size of an intermediate query 120 exceeds a threshold size indicated by the threshold data 202, the intermediate query 120 may be excluded from the output 112.

Other modules 530 may also be present in the memory 518. For example, encryption modules may be used to encrypt and decrypt communications between computing devices 502. User interface modules may be configured to present user interfaces to user devices 104, receive user input 102, and so forth. For example, a user interface module may receive modification or selection associated with a query 528 presented in the output 112. User account modules may be configured to determine account data and maintain user accounts. One or more queries 528 may be stored in association with particular user accounts. Machine learning modules may be configured to determine relationships between received user input 102, the pruning data 122, and the threshold data 202. For example, machine learning modules may modify one or more threshold values based on the queries 528 within the output 112 that are selected or modified by users.

Other data 532 within the data store 522 may include user input data, such as configurations and settings associated with computing devices 502. Other data 532 may also include security data, such as encryption keys and schema, access credentials, and so forth. Other data 532 may additionally include one or more algorithms used to determine weights or values associated with parameters 208. For example, in some implementations, a parameter 208 may have a value based on one or more of an importance metric 210 or a changeability metric 212. The other data 532 may include one or more algorithms for computing the value for a parameter 208 based on importance metrics 210, changeability metrics 212, or other factors.

In different implementations, different computing devices 502 may have different capabilities or capacities. For example, query servers 110 may have significantly more processor 506 capability and memory 518 capacity compared to the processor 506 capability and memory 518 capacity of user devices 104.

The processes discussed in this disclosure may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described in this disclosure. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

What is claimed is:

1. A system comprising:
one or more memories storing computer-executable instructions; and
one or more hardware processors to execute the computer-executable instructions to:
receive first user input indicative of a plurality of data objects stored within a data store, wherein each data object of the plurality of data objects is associated with a respective set of parameters;
determine the respective sets of parameters associated with each data object of the plurality of data objects;
generate an initial query including each parameter of the respective sets of parameters, wherein the initial query has a first count of parameters;
determine correspondence between the respective sets of parameters and pruning data indicative of a first importance metric that indicates a rate of occurrence of a first parameter within the data store and a second importance metric that indicates a rate of occurrence of a second parameter within the data store;
determine that the first importance metric deviates from a first threshold importance metric;
remove the first parameter from the initial query to form an intermediate query, wherein the intermediate query has a second count of parameters that is less than the first count;
determine that querying the data store using the intermediate query locates each data object of the plurality of data objects;
determine that the second importance metric deviates from a second threshold importance metric;
remove the second parameter from the intermediate query to form a final query, wherein the final query has a third count of parameters that is less than the second count;
determine that querying the data store using the final query locates the plurality of data objects; and
output a user interface indicating the initial query, the intermediate query, and the final query.

2. The system of claim 1, further comprising computer-executable instructions to:
determine, based on the pruning data, particular parameters of the plurality of data objects having importance metrics that deviate from an initial threshold metric;
wherein the computer-executable instructions to determine the respective sets of parameters associated with each data object of the plurality of data objects and to generate the initial query exclude the particular parameters having importance metrics that deviate from the initial threshold metric.

3. The system of claim 1, further comprising computer-executable instructions to:
determine a size of the intermediate query to be less than a threshold size;
wherein the intermediate query is included in the user interface based on the size of the intermediate query being less than the threshold size.

4. The system of claim 1, further comprising computer-executable instructions to:
determine correspondence between one or more third parameters and the pruning data, wherein the one or more third parameters differ from the first parameter and the second parameter;
add the one or more third parameters to the final query to form a reconstituted query that is different from the initial query and the intermediate query; and
include the reconstituted query in the user interface.

5. A method comprising:
receiving user input indicating at least one data object within a data store, wherein the at least one data object is associated with a plurality of parameters;
determining the plurality of parameters associated with the at least one data object;
generating a first query including at least a subset of the plurality of parameters, wherein application of the first query to the data store locates the at least one data object, and wherein the first query includes a first count of parameters;
determining correspondence between the at least a subset of the plurality of parameters and pruning data;
based on the pruning data, removing at least a first parameter from the first query to form a second query, wherein the second query includes a second count of parameters that is less than the first count;
determining that application of the second query to the data store locates the at least one data object;
based on the pruning data, removing at least a second parameter from the second query to form a third query, wherein the third query includes a third count of parameters that is less than the second count;
determining that application of the third query to the data store locates the at least one data object; and
outputting data indicative of one or more of the first query, the second query, or the third query.

6. The method of claim 5, wherein the pruning data includes importance metrics associated with the plurality of parameters, the importance metrics indicative of a rate of occurrence of particular parameters of the plurality of parameters within the data store, the method further comprising:

determining that one or more importance metrics for the at least a first parameter deviate from a threshold importance metric; and selecting the at least a first parameter for removal from the first query based on the one or more importance metrics deviating from the threshold importance metric.

7. The method of claim 5, wherein the pruning data includes changeability metrics associated with the plurality of parameters, the changeability metrics indicative of a rate of change associated with particular parameters of the plurality of parameters within the data store, the method further comprising:

determining that one or more changeability metrics for the at least a first parameter deviate from a threshold changeability metric; and selecting the at least a first parameter for removal from the first query based on the one or more changeability metrics deviating from the threshold changeability metric.

8. The method of claim 5, further comprising:

determining a size of the second query to be less than a threshold size;

wherein the outputting of the second query and the third query is performed responsive to the size of the second query being less than the threshold size.

9. The method of claim 5, further comprising:

determining the at least a first parameter to include a count of parameters greater than a threshold count of parameters;

wherein the outputting of the second query and the third query is performed responsive to the count of parameters being greater than the threshold count of parameters.

10. The method of claim 5, further comprising:

based on the pruning data, removing at least a third parameter from the third query to form a fourth query;

determining that application of the fourth query to the data store locates one or more data objects that differ from the at least one data object; and suppressing the fourth query from output.

11. The method of claim 5, further comprising:

receiving user input indicative of one or more of a modification or a selection of one or more of the second query or the third query to form a user query;

determining a user account associated with the user input; and storing the user query in association with the user account.

12. The method of claim 5, further comprising:

storing the second query as pruning data; and determining correspondence between the third query and the second query;

wherein removal of the at least a second parameter from the second query to form the third query is performed responsive to the correspondence between the third query and the second query.

13. A system comprising:

one or more memories storing computer-executable instructions; and one or more hardware processors to execute the computer-executable instructions to:

access a first query comprising a plurality of parameters, the first query configured to locate at least one data object when applied to a data store, wherein the first query includes a first count of parameters;

determine correspondence between at least a subset of the plurality of parameters and pruning data, wherein the pruning data includes one or more of:

importance metrics associated with respective parameters, the importance metrics indicative of a rate of occurrence of particular respective parameters within the data store; or changeability metrics associated with the respective parameters, the changeability metrics indicative of a rate of change associated with the particular respective parameters within the data store;

based on the correspondence between the pruning data and the at least a subset of the plurality of parameters, remove at least a first parameter from the first query to form a second query, wherein the second query includes a second count of parameters that is less than the first count;

determine that application of the second query to the data store locates the at least one data object; and generate an output including one or more of the first query or the second query.

14. The system of claim 13, further comprising computer-executable instructions to:

store the second query as pruning data;

based on the correspondence between the second query and the at least a subset of the plurality of parameters, remove at least a second parameter from the second query to form a third query;

determine that application of the third query to the data store locates the at least one data object; and store the third query as pruning data.

15. The system of claim 14, further comprising computer-executable instructions to:

receive user input indicative of one or more of a modification or a selection of one or more of the second query or the third query to form a user query; and store the user query in association with a user account.

16. The system of claim 13, further comprising computer-executable instructions to:

based on the correspondence between the pruning data and the at least a subset of the plurality of parameters, remove at least a second parameter from the second query to form a third query;

determine that application of the third query to the data store locates one or more data objects that differ from the at least one data object; and suppress the third query from the output.

17. The system of claim 13, wherein the computer-executable instructions to remove the at least a first parameter from the first query include computer-executable instructions to:

remove a first set of parameters from the first query to form a modified query;

determine a first size of the modified query to be greater than a threshold size;

responsive to the first size of the modified query being greater than the threshold size, remove a second set of parameters from the modified query to form the second query; and determine a second size of the second query to be less than the threshold size;

wherein the second query is included in the output based on the second size being less than the threshold size.

18. The system of claim 13, further comprising computer-executable instructions to:

based on the correspondence between the pruning data and the at least a subset of the plurality of parameters, remove at least a second parameter from the second query to form a third query;

determine that application of the third query to the data store locates the at least one data object;

determine that removal of one or more third parameters from the third query to form a fourth query causes application of the fourth query to the data store to locate one or more data objects that differ from the at least one data object; and include the third query in the output.

19. The system of claim 13, further comprising computer-executable instructions to:

receive user input indicating the at least one data object;

determine the plurality of parameters associated with the at least one data object; and generate the first query based on the plurality of parameters.

20. The system of claim 13, further comprising computer-executable instructions to:

receive user input indicative of one or more of the respective parameters, the user input indicating one or more of a preference or weight for inclusion or exclusion of the one or more of the respective parameters in the second query; and generate at least a portion of the pruning data based at least in part on the user input.

* * * * *

UNITED STATES PATENT AND TRADEMARK OFFICE
CERTIFICATE OF CORRECTION

PATENT NO. : 10,642,805 B1
APPLICATION NO. : 15/376084
DATED : May 5, 2020
INVENTOR(S) : James Edward Masse Page 1 of 1

It is certified that error appears in the above-identified patent and that said Letters Patent is hereby corrected as shown below:

On the Title Page

Missing Reference under "(56) References Cited":
--2016/0078361 Brueckner et al.--

Signed and Sealed this
Thirtieth Day of June, 2020

Andrei Iancu
*Director of the United States Patent and Trademark Office*